United States Patent
Ueda (10) Patent No.: US 11,193,630 B2
(45) Date of Patent: Dec. 7, 2021

(54) HIGH PRESSURE TANK AND METHOD FOR MANUFACTURING THE SAME

(71) Applicant: TOYOTA JIDOSHA KABUSHIKI KAISHA, Toyota (JP)

(72) Inventor: Naoki Ueda, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 28 days.

(21) Appl. No.: 16/815,210

(22) Filed: Mar. 11, 2020

(65) Prior Publication Data
US 2020/0309320 A1     Oct. 1, 2020

(30) Foreign Application Priority Data
Apr. 1, 2019    (JP) .............................. JP2019-069959

(51) Int. Cl.
*F17C 1/02* (2006.01)
*B29C 53/58* (2006.01)
*B29L 31/00* (2006.01)

(52) U.S. Cl.
CPC ............... *F17C 1/02* (2013.01); *B29C 53/58* (2013.01); *B29L 2031/7156* (2013.01); *F17C 2201/0109* (2013.01); *F17C 2203/0604* (2013.01); *F17C 2203/067* (2013.01); *F17C 2203/0619* (2013.01); *F17C 2260/011* (2013.01)

(58) Field of Classification Search
CPC ................ F17C 1/06; F17C 1/04; F17C 1/02
USPC ................... 220/590, 589, 588, 586
See application file for complete search history.

(56) References Cited

U.S. PATENT DOCUMENTS

| | | | | |
|---|---|---|---|---|
| 2,744,043 A | * | 5/1956 | Ramberg | B29D 22/003 156/155 |
| 3,047,191 A | * | 7/1962 | Young | B29D 22/003 220/588 |
| 3,144,952 A | * | 8/1964 | Uhlig | F17C 1/16 220/590 |
| 3,303,079 A | * | 2/1967 | Carter | B29C 53/602 156/172 |

(Continued)

FOREIGN PATENT DOCUMENTS

| | | |
|---|---|---|
| WO | 2012160640 A1 | 11/2012 |
| WO | 2017149817 A1 | 9/2017 |

OTHER PUBLICATIONS

Masterbond, "EP29LP Product Information", Wayback Machine, "https://web.archive.org/web/20170427182752/http://www.masterbond.com/tds/ep29lp", Apr. 27, 2017, p. 1 (Year: 2017).*

*Primary Examiner* — Robert J Hicks
(74) *Attorney, Agent, or Firm* — Dickinson Wright, PLLC (57) ABSTRACT

The high pressure tank includes a liner, a hoop layer, and a helical layer. The liner includes a cylindrically-shaped trunk portion and dome portions disposed on both ends in an axial direction of the trunk portion. In the hoop layer, a fiber impregnated with a resin is wound in hoop winding and laminated to cover the trunk portion. In the helical layer, a fiber impregnated with a resin is wound in helical winding and laminated to cover at least the dome portions. An interface strength between the fiber and the resin on the hoop layer covering the trunk portion has a low fatigue strength and a high tensile strength compared with an interface strength between the fiber and the resin on the helical layer covering the dome portions.

6 Claims, 8 Drawing Sheets

(56) References Cited

U.S. PATENT DOCUMENTS

| | | | | |
|---|---|---|---|---|
| 3,969,812 | A * | 7/1976 | Beck | B21D 51/24 |
| | | | | 29/421.1 |
| 6,190,481 | B1 * | 2/2001 | Iida | B29C 70/382 |
| | | | | 156/175 |
| 8,740,009 | B2 * | 6/2014 | Otsuka | F17C 13/06 |
| | | | | 220/589 |
| 2009/0101658 | A1 * | 4/2009 | Maile | B32B 18/00 |
| | | | | 220/590 |
| 2009/0236349 | A1 * | 9/2009 | Mueller | F17C 1/06 |
| | | | | 220/590 |
| 2012/0024746 | A1 * | 2/2012 | Otsubo | F17C 13/06 |
| | | | | 206/524.3 |
| 2014/0096895 | A1 | 4/2014 | Emori | |
| 2018/0290537 | A1 * | 10/2018 | Ueda | B29C 53/822 |
| 2018/0356037 | A1 * | 12/2018 | Yokoi | F17C 1/02 |
| 2019/0077109 | A1 | 3/2019 | Takemoto et al. | |
| 2019/0099937 | A1 * | 4/2019 | Kono | D06M 10/025 |
| 2019/0195429 | A1 * | 6/2019 | Ueda | F17C 1/16 |
| 2019/0285227 | A1 * | 9/2019 | Veenstra | F17C 1/02 |

\* cited by examiner

HIGH PRESSURE TANK AND METHOD FOR MANUFACTURING THE SAME

CROSS REFERENCE TO RELATED APPLICATIONS

The present application claims priority from Japanese patent application JP 2019-069959 filed on Apr. 1, 2019, the content of which is hereby incorporated by reference into this application.

BACKGROUND

Technical Field

The present disclosure relates to a high pressure tank and a method for manufacturing the high pressure tank.

Background Art

As a high pressure tank, such as a hydrogen tank, mounted to a fuel cell vehicle, there has been known a high pressure tank that includes a liner and a reinforcing layer. The liner includes a cylindrically-shaped trunk portion and dome portions disposed on both ends in the axial direction of the trunk portion. The reinforcing layer is formed to cover the liner by winding a fiber impregnated with a resin. The reinforcing layer includes a hoop layer in which the fiber impregnated with the resin is wound in hoop winding and laminated on an outer periphery of the trunk portion, and a helical layer in which the fiber impregnated with the resin is wound in helical winding and laminated on an outer periphery of the liner including the dome portions. Thus configured high pressure tank is required to have a high tensile strength and a high fatigue strength for ensuring safety. Various techniques have been proposed to meet these requirements.

As one example, for example, WO 2017/149817 discloses a technique in which a fiber wound around dome portions of a liner is irradiated with plasma to enhance adhesion of resin to the fiber, and thereby improving fatigue strength of a high pressure tank.

However, the above-described technique has a limitation in enhancing the fatigue strength because the plasma irradiation reaches only a surface layer of the fiber impregnated with the resin and does not reach inner layers of the fiber impregnated with the resin. In addition, it is difficult to enhance the tensile strength of the high pressure tank only with this plasma irradiation.

The present disclosure has been made to solve such a technical problem, and provides a high pressure tank capable of providing a tensile strength and a fatigue strength at the same time and a method for manufacturing the high pressure tank.

SUMMARY

A high pressure tank according to the present disclosure is a high pressure tank that includes a liner, a hoop layer, and a helical layer. The liner includes a cylindrically-shaped trunk portion and dome portions disposed on both ends in an axial direction of the trunk portion. In the hoop layer, a fiber impregnated with a resin is wound in hoop winding and laminated to cover the trunk portion. In the helical layer, a fiber impregnated with a resin is wound in helical winding and laminated to cover at least the dome portions. An interface strength between the fiber and the resin on the hoop layer covering the trunk portion has a low fatigue strength and a high tensile strength compared with an interface strength between the fiber and the resin on the helical layer covering the dome portions.

In the high pressure tank according to the present disclosure, the interface strength between the fiber and the resin on the hoop layer covering the trunk portion has the low fatigue strength and the high tensile strength compared with the interface strength between the fiber and the resin on the helical layer covering the dome portion. Accordingly, the trunk portion having a significant influence on the tensile strength of the high pressure tank is reinforced with the hoop layer having the interface strength with the high tensile strength, and the dome portions having a significant influence on the fatigue strength of the high pressure tank are reinforced with the helical layers having the interface strength with the high fatigue strength. Consequently, the tensile strength and the fatigue strength of the high pressure tank can be provided at the same time.

In the high pressure tank according to the present disclosure, the fiber and/or the resin used for the hoop layer covering the trunk portion and the helical layer covering the dome portions may be different.

In the high pressure tank according to the present disclosure, heating amounts for heating the resins of the hoop layer covering the trunk portion and the helical layer covering the dome portions may be different.

A method for manufacturing a high pressure tank according to the present disclosure is a method for manufacturing a high pressure tank that includes a liner that includes a cylindrically-shaped trunk portion and dome portions disposed on both ends in an axial direction of the trunk portion, a hoop layer in which a fiber impregnated with a resin is wound in hoop winding and laminated to cover the trunk portion, and a helical layer in which a fiber impregnated with a resin is wound in helical winding and laminated to cover at least the dome portions, the method includes: a hoop layer lamination step of laminating the hoop layer covering the trunk portion so as to have a low fatigue strength and a high tensile strength compared with the helical layer covering the dome portions for an interface strength between the fiber and the resin; and a helical layer lamination step of laminating the helical layer covering the dome portions so as to have a high fatigue strength and a low tensile strength compared with the hoop layer covering the trunk portion for an interface strength between the fiber and the resin.

The method for manufacturing a high pressure tank according to the present disclosure includes the hoop layer lamination step of laminating the hoop layer covering the trunk portion so as to have the low fatigue strength and the high tensile strength compared with the helical layer covering the dome portions in the interface strength between the fiber and the resin, and the helical layer lamination step of laminating the helical layer covering the dome portions so as to have the high fatigue strength and the low tensile strength compared with the hoop layer covering the trunk portion in the interface strength between the fiber and the resin. Accordingly, the dome portions having a significant influence on the fatigue strength of the high pressure tank can be reinforced with the helical layer having the interface strength with the high fatigue strength while the trunk portion having a significant influence on the tensile strength of the high pressure tank is reinforced with the hoop layer having the interface strength with the high tensile strength. Consequently, the tensile strength and the fatigue strength of the manufactured high pressure tank can be provided at the same time.

In the method for manufacturing a high pressure tank according to the present disclosure, the fiber and/or the resin used in the hoop layer lamination step and the helical layer lamination step may be different.

The method for manufacturing a high pressure tank according to the present disclosure further includes a thermally curing step of thermally curing the laminated hoop layer and the laminated helical layer. In the thermally curing step, a heating amount for heating the hoop layer covering the trunk portion may be different from a heating amount for heating the helical layer covering the dome portions.

The present disclosure can provide the tensile strength and the fatigue strength at the same time.

DETAILED DESCRIPTION

The following describes embodiments of a high pressure tank and a method for manufacturing the high pressure tank according to the present disclosure with reference to the drawings. In the following description, a "fiber impregnated with a resin" is abbreviated to a "resin-impregnated fiber," and an "interface strength between a fiber and a resin" is abbreviated to an "interface strength" insofar as they are not specifically mentioned.

[High Pressure Tank]

Figure 1:
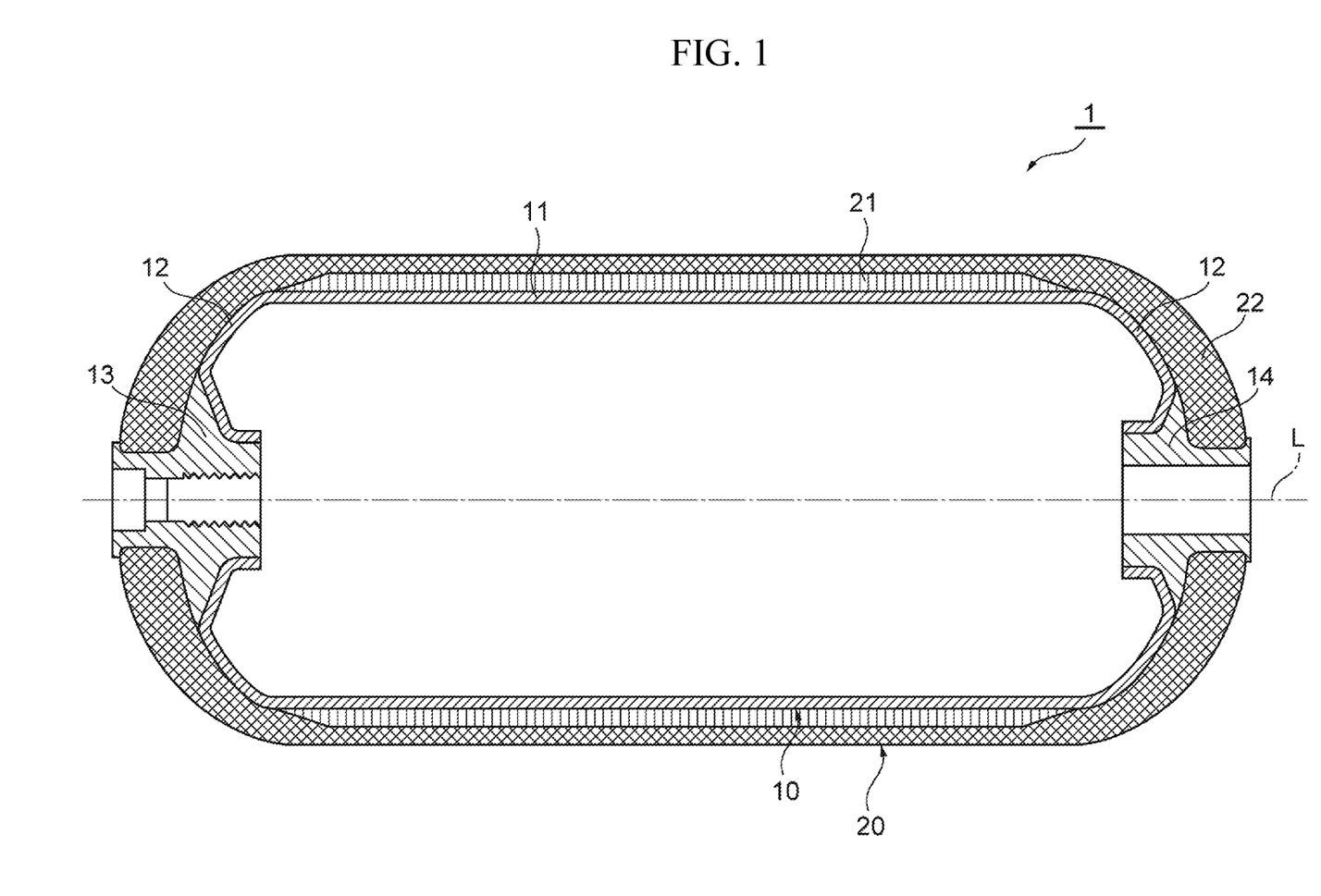
FIG. 1 is a cross-sectional view illustrating a structure of a high pressure tank.

First, a structure of the high pressure tank will be described based on FIG. 1. FIG. 1 is a cross-sectional view illustrating the structure of the high pressure tank. A high pressure tank 1 is a hydrogen tank mounted to, for example, a fuel cell vehicle, and includes a liner 10, a hoop layer 21, and a helical layer 22. The liner 10 includes a cylindrically-shaped trunk portion 11 and dome portions 12 disposed on both ends in the axial direction of the trunk portion 11. In the hoop layer 21, a fiber impregnated with a resin is wound in hoop winding and laminated to cover the trunk portion 11. In the helical layer 22, a fiber impregnated with the resin is wound in helical winding and laminated to cover the dome portions 12 and the trunk portion 11 (that is, the whole of the liner 10). The hoop layer 21 and the helical layer 22 constitute what is called a reinforcing layer 20.

The liner 10 is a hollow vessel that includes a storage space for storing high pressure hydrogen, and formed of a material having a gas barrier property for hydrogen gas. The liner 10 includes the trunk portion 11 and a pair of the dome portions 12 as described above. The dome portions 12 have hemispherical shapes. The pair of dome portions 12 each have an opening on a top, and a valve-side base 13 is internally inserted to one of these openings while an end-side base 14 is internally inserted to the other.

The liner 10 is integratedly formed using a resin material, such as polyethylene and nylon, with a rotation blow molding method. The liner 10 may be formed of a light metal, such as aluminum instead of the resin material. Furthermore, the liner 10 may be formed by joining a plurality of divided members using an injection/extrusion molding and the like, instead of the manufacturing method by integrated molding, such as the rotation blow molding method.

Figure 2A:
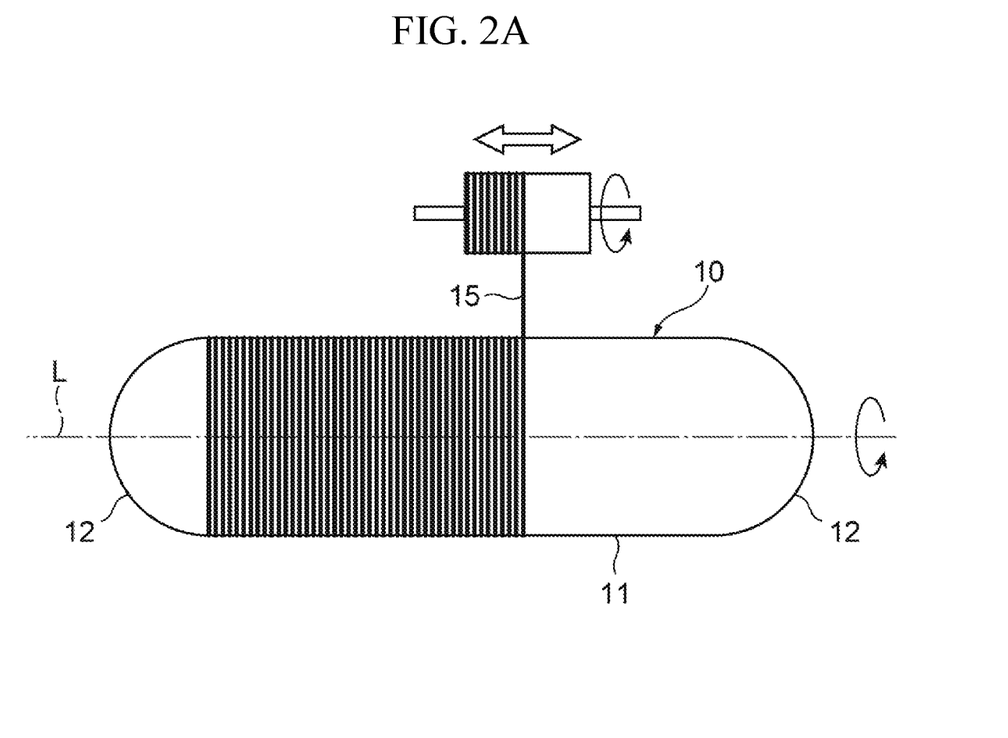
FIG. 2A is a schematic diagram for describing a hoop winding.

As illustrated in FIG. 2A, the hoop layer 21 is a reinforcing layer formed by winding a resin-impregnated fiber (for example, a hoop winding resin-impregnated fiber 15) in hoop winding in a circumferential direction of the trunk portion 11 with a winding angle approximately perpendicular to the central axis L of the liner 10. Here, "approximately perpendicular" includes both 90° and an angle about 90° possibly caused by shifting winding positions of the hoop winding resin-impregnated fiber 15 to avoid overlapping of the hoop winding resin-impregnated fiber 15.

Figure 2B:
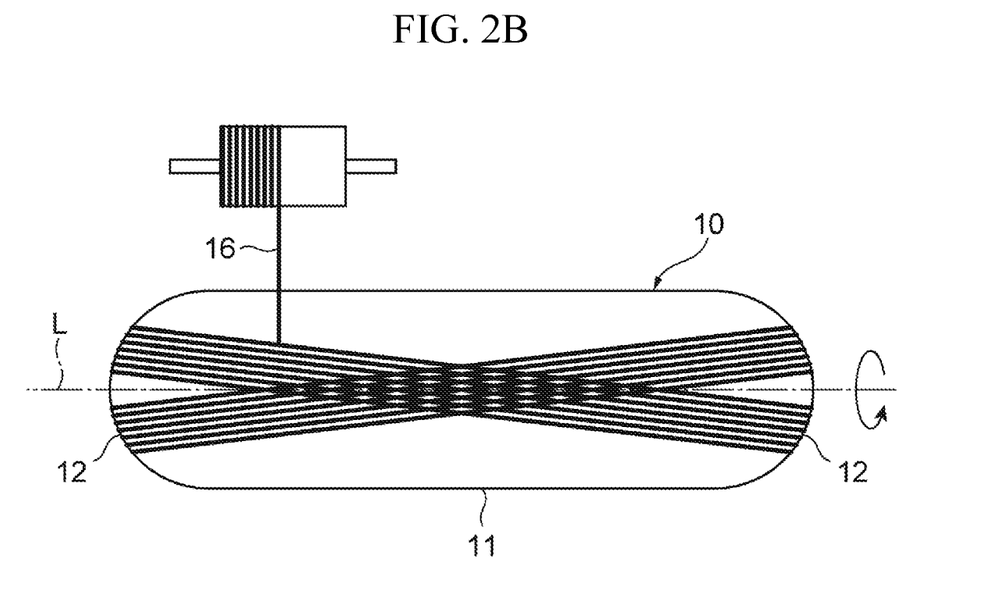
FIG. 2B is a schematic diagram for describing a helical winding.

The helical layer 22 is formed to cover the whole liner 10 so as to wrap the laminated hoop layer 21 and the dome portions 12. As illustrated in FIG. 2B, the helical layer 22 is formed by winding a resin-impregnated fiber (for example, a helical winding resin-impregnated fiber 16) in helical winding in the circumferential direction of the trunk portion 11 and the dome portions 12 with the winding angle of more than 0° and less than 90° with the central axis L of the liner 10. The helical winding is further classified into a low-angle helical winding and a high-angle helical winding depending on the winding angle.

The low-angle helical winding is namely a helical winding with a small winding angle (for example, more than 0° and 30° or less), and this winding method causes a winding direction of the helical winding resin-impregnated fiber 16 on the dome portion 12 to be reversed before the helical winding resin-impregnated fiber 16 goes round the central axis L once. The high-angle helical winding is namely a helical winding with a large winding angle (for example, more than 30° and less than 90°), and a winding method where the helical winding resin-impregnated fiber 16 goes round the central axis L at least once on the trunk portion 11 before the winding direction of the helical winding resin-impregnated fiber 16 is reversed on the dome portion 12. FIG. 2B illustrates the low-angle helical winding.

The hoop winding resin-impregnated fiber 15 and the helical winding resin-impregnated fiber 16 are formed by, for example, impregnating a bundle of single fibers having diameters of about a few μm with an uncured thermosetting resin. The single fiber can include a fiber, such as a glass fiber, a carbon fiber, an aramid fiber, an alumina fiber, a boron fiber, a steel fiber, a PBO fiber, a natural fiber, or a high strength polyethylene fiber. The thermosetting resin can include an epoxy resin, a modified epoxy resin typified by a vinylester resin, a phenolic resin, a melamine resin, a urea resin, an unsaturated polyester resin, an alkyd resin, a polyurethane resin, and a thermosetting polyimide resin. For the hoop winding resin-impregnated fiber 15 and the helical winding resin-impregnated fiber 16, the same resin and the same fiber may be used, or different resins and/or different fibers may be used.

Figure 3A:
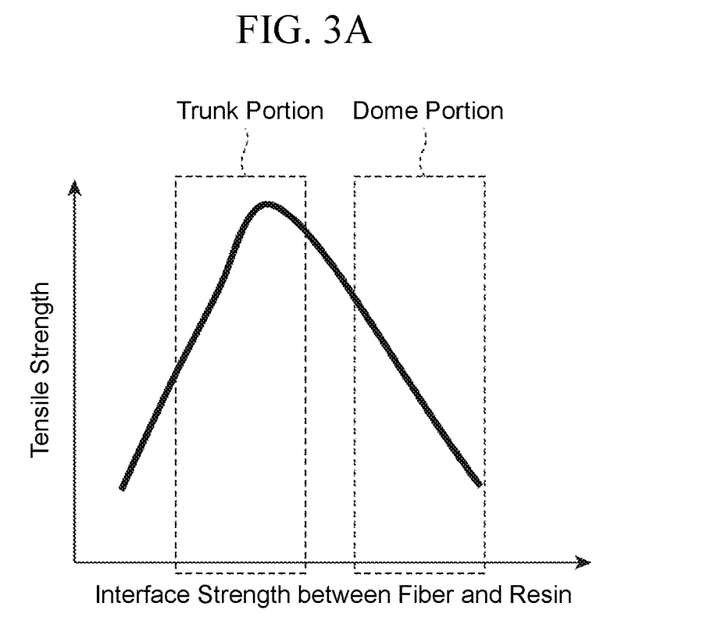
FIG. 3A is a diagram illustrating a relation between an interface strength between a fiber and a resin and a tensile strength.
Figure 3B:
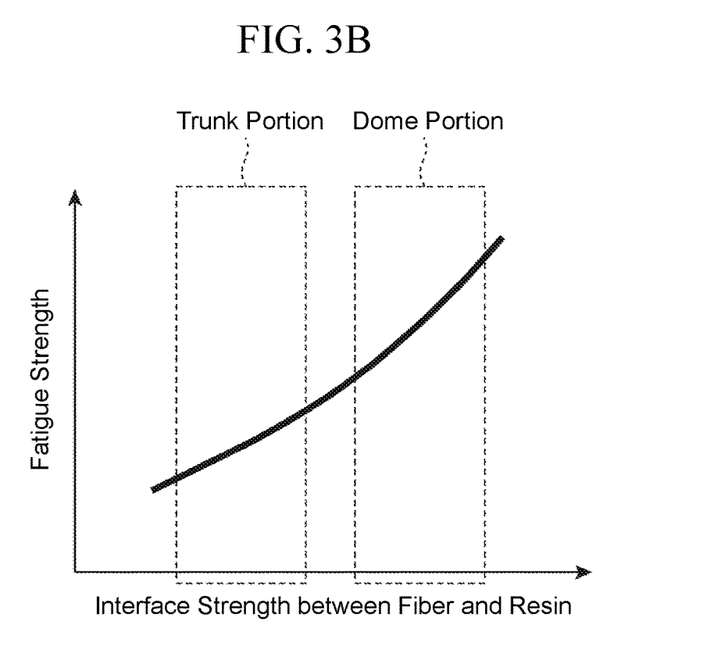
FIG. 3B is a diagram illustrating a relation between the interface strength between the fiber and the resin and a fatigue strength.

Here, a background to the present disclosure will be described. FIG. 3A is a diagram illustrating a relation between an interface strength between a fiber and a resin and a tensile strength, and FIG. 3B is a diagram illustrating a relation between the interface strength between the fiber and the resin and a fatigue strength. As illustrated in FIG. 3A, the tensile strength increases as the interface strength between the fiber and the resin increases, but after exceeding a certain value, the tensile strength decreases though the interface strength between the fiber and the resin increases. Meanwhile, as illustrated in FIG. 3B, the fatigue strength increases as the interface strength between the fiber and the resin increases. The tensile strength here is also referred to as an initial strength or a static strength, and the fatigue strength is also referred to as an interlaminar shear strength. The interface strength between the fiber and the resin can be measured by, for example, already well-known push-out method or droplet method.

It has been known that the tensile strength of the high pressure tank 1 is significantly influenced by the hoop layer 21 covering the trunk portion 11 of the liner 10, and the fatigue strength of the high pressure tank 1 is significantly influenced by the helical layer 22 covering the dome portions 12 of the liner 10.

Therefore, the inventor found that the tensile strength and the fatigue strength of the high pressure tank 1 can be provided at the same time by optimizing each of the interface strength on the hoop layer 21 covering the trunk portion 11 of the liner 10 and the interface strength on the helical layer 22 covering the dome portions 12, that is, by making the interface strength on the hoop layer 21 covering the trunk portion 11 an interface strength where the tensile strength becomes as high as possible while the interface strength on the helical layer 22 covering the dome portions 12 is made to be an interface strength where the fatigue strength becomes as high as possible (see regions surrounded by dashed lines in FIG. 3A and FIG. 3B). In this case, as illustrated in FIG. 3A and FIG. 3B, the interface strength on the hoop layer 21 covering the trunk portion 11 is smaller than the interface strength on the helical layer 22 covering the dome portions 12.

Furthermore, the inventor continued serious studies, and consequently found that the optimization of each of the interface strength on the hoop layer 21 covering the trunk portion 11 and the interface strength on the helical layer 22 covering the dome portions 12 is ensured by, for example, using different resin and/or fiber for the hoop winding resin-impregnated fiber 15 and the helical winding resin-impregnated fiber 16, or making a physical property of the hoop layer 21 covering the trunk portion 11 different from physical a property of the helical layer 22 covering the dome portions 12 by heating.

As the method of using different resin and/or fiber for the hoop winding resin-impregnated fiber 15 and the helical winding resin-impregnated fiber 16, for example, a material having the interface strength where the fatigue strength is low and the tensile strength is high compared with the interface strength on the helical layer is used for the hoop layer, while a material having the interface strength where the fatigue strength is high and the tensile strength is low compared with the interface strength on the hoop layer is used for the helical layer.

Meanwhile, as the method of making the physical property of the hoop layer 21 covering the trunk portion 11 different from the physical property of the helical layer 22 covering the dome portions 12 by heating, for example, a heating amount for heating the helical layer 22 covering the dome portions 12 is increased compared with a heating amount for heating the hoop layer 21 covering the trunk portion 11.

Accordingly, in the high pressure tank 1 according to the embodiment, the interface strength on the hoop layer 21 covering the trunk portion 11 has the low fatigue strength and the high tensile strength compared with the interface strength on the helical layer 22 covering the dome portions 12.

In thus configured high pressure tank 1, the interface strength on the hoop layer 21 covering the trunk portion 11 has the low fatigue strength and the high tensile strength compared with the interface strength on the helical layer 22 covering the dome portions 12. Therefore, the trunk portion 11 having a significant influence on the tensile strength of the high pressure tank 1 is reinforced with the hoop layer 21 having the interface strength with the high tensile strength, and the dome portions 12 having a significant influence on the fatigue strength of the high pressure tank 1 is reinforced with the helical layer 22 having the interface strength with the high fatigue strength. Consequently, the tensile strength and the fatigue strength of the high pressure tank 1 can be provided at the same time.

In the high pressure tank 1 according to the embodiment, for the hoop layer 21 covering the trunk portion 11 and the helical layer 22 covering the dome portions 12, the fiber and/or the resin to be used may be different, or the heating amount for heating the resin impregnated in the fiber may be different. Accordingly, the interface strength on the hoop layer 21 covering the trunk portion 11 has the low fatigue strength and the high tensile strength compared with the interface strength on the helical layer 22 covering the dome portions 12, and the tensile strength and the fatigue strength of the high pressure tank 1 can be easily provided at the same time.

[Method for Manufacturing High Pressure Tank]

The following describes embodiments of a method for manufacturing the high pressure tank 1. In a first embodiment, a description will be given of the method for manufacturing the high pressure tank where the type of the resin-impregnated fiber to be used is different for the hoop layer 21 covering the trunk portion 11 and the helical layer 22 covering the dome portions 12, and in a second embodiment, a description will be given of the method for manufacturing the high pressure tank where the heating amount for heating the resin is different for the hoop layer 21 covering the trunk portion 11 and the helical layer 22 covering the dome portions 12.

First Embodiment

The method for manufacturing the high pressure tank 1 according to the first embodiment includes: a hoop layer lamination step of laminating the hoop layer 21 covering the trunk portion 11 so as to have the low fatigue strength and the high tensile strength compared with the helical layer 22 covering the dome portions 12 for the interface strength between the fiber and the resin; a helical layer lamination step of laminating the helical layer 22 covering the dome portions 12 so as to have the high fatigue strength and the low tensile strength compared with the hoop layer 21 covering the trunk portion 11 for the interface strength between the fiber and the resin; and a thermally curing step of thermally curing the laminated hoop layer 21 and the laminated helical layer 22.

Specifically, first, in the hoop layer lamination step, the hoop winding resin-impregnated fiber 15 is wound around the trunk portion 11 of the liner 10 to laminate a plurality of hoop layers 21. At this time, the resin of the hoop winding resin-impregnated fiber 15 is a resin containing an acid anhydride as a curing agent, and has the interface strength between the fiber and the resin of about 20 MPa. Here, the main agent of the resin may be changed instead of the curing agent. Alternatively, O/C value (that is, an oxygen concentration of carbon fiber surface) of a carbon fiber sizing agent of the hoop winding resin-impregnated fiber 15 may be changed, or a fiber surface roughness may be changed, or a sizing agent applied over the fiber may be changed.

In the helical layer lamination step following the hoop layer lamination step, the helical winding resin-impregnated fiber 16 is wound around the liner 10 to laminate a plurality of helical layers 22 so as to wrap the laminated hoop layers 21 and the dome portions 12. At this time, the resin of the helical winding resin-impregnated fiber 16 contains an aromatic amine as a curing agent, and has the interface strength between the fiber and the resin of about 76 MPa Here, the main agent of the resin may be changed instead of the curing agent. Alternatively, O/C value (that is, an oxygen concentration of carbon fiber surface) of a carbon fiber sizing agent of the helical winding resin-impregnated fiber 16 may be changed, or a fiber surface roughness may be changed, or a sizing agent applied over the fiber may be changed.

Next, as necessary, the lamination step of the hoop layer 21 and the lamination step of the helical layer 22 described above are repeatedly performed to form the uncured reinforcing layer 20 on an outer periphery of the liner 10.

Meanwhile, in the thermally curing step, the liner 10 including the laminated hoop layer 21 and the laminated helical layer 22 is put into a thermal curing furnace and heated at a temperature of, for example, about 85° C., and the resins in the hoop winding resin-impregnated fiber 15 and the helical winding resin-impregnated fiber 16 are thermally cured. Thus, the high pressure tank 1 is manufactured.

The method for manufacturing the high pressure tank 1 according to the embodiment includes the hoop layer lamination step of laminating the hoop layer 21 covering the trunk portion 11 so as to have the low fatigue strength and the high tensile strength compared with the helical layer 22 covering the dome portions 12 for the interface strength between the fiber and the resin, and the helical layer lamination step of laminating the helical layer 22 covering the dome portions 12 so as to have the high fatigue strength and the low tensile strength compared with the hoop layer 21 covering the trunk portion 11 for the interface strength between the fiber and the resin. Accordingly, the dome portions 12 having a significant influence on the fatigue strength of the high pressure tank 1 can be reinforced with the helical layer 22 having the interface strength with the high fatigue strength while the trunk portion 11 having a significant influence on the tensile strength of the high pressure tank 1 is reinforced with the hoop layer 21 having the interface strength with the high tensile strength. Consequently, the tensile strength and the fatigue strength of the manufactured high pressure tank 1 can be provided at the same time.

In the method for manufacturing the high pressure tank 1 according to the embodiment, the use of two different types of the resin-impregnated fibers, the hoop winding resin-impregnated fiber 15 and the helical winding resin-impregnated fiber 16, ensures easily providing the tensile strength and the fatigue strength of the high pressure tank 1 at the same time.

Second Embodiment

A method for manufacturing the high pressure tank 1 according to the second embodiment includes the hoop layer lamination step, the helical layer lamination step, and the thermally curing step similarly to the above-described first embodiment. However, the method is different from that of the first embodiment in that the hoop winding resin-impregnated fiber 15 is the same as the helical winding resin-impregnated fiber 16, and the heating amount for heating the hoop layer 21 covering the trunk portion 11 is different from the heating amount for heating the helical layer 22 covering the dome portions 12 in the thermally curing step. The following describes only the difference.

That is, the fiber and the resin of the hoop winding resin-impregnated fiber 15 used in the hoop layer lamination step are entirely the same as those of the helical winding resin-impregnated fiber 16 used in the thermally curing step. Meanwhile, in the thermally curing step, the heating amount for heating the helical layer 22 covering the dome portions 12 is increased compared with the heating amount for heating the hoop layer 21 covering the trunk portion 11.

Figure 4:
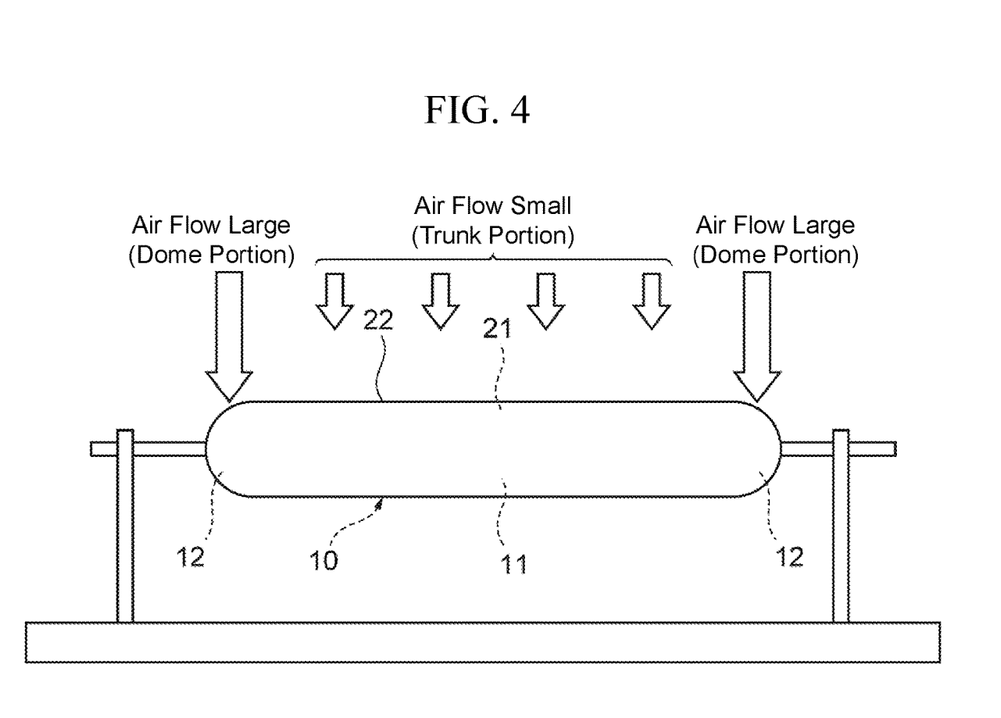
FIG. 4 is a schematic diagram illustrating a state where a hoop layer covering a trunk portion and a helical layer covering dome portions are thermally cured.

More specifically, in the thermally curing step, as illustrated in FIG. 4, a hot air is blown to the hoop layer 21 covering the trunk portion 11 and the helical layer 22 covering the dome portions 12 to thermally cure the resin of the hoop winding resin-impregnated fiber 15 and the resin of the helical winding resin-impregnated fiber 16. At this time, an air flow blown to the hoop layer 21 covering the trunk portion 11 is relatively decreased while an air flow blown to the helical layer 22 covering the dome portions 12 is relatively increased.

Figure 5:
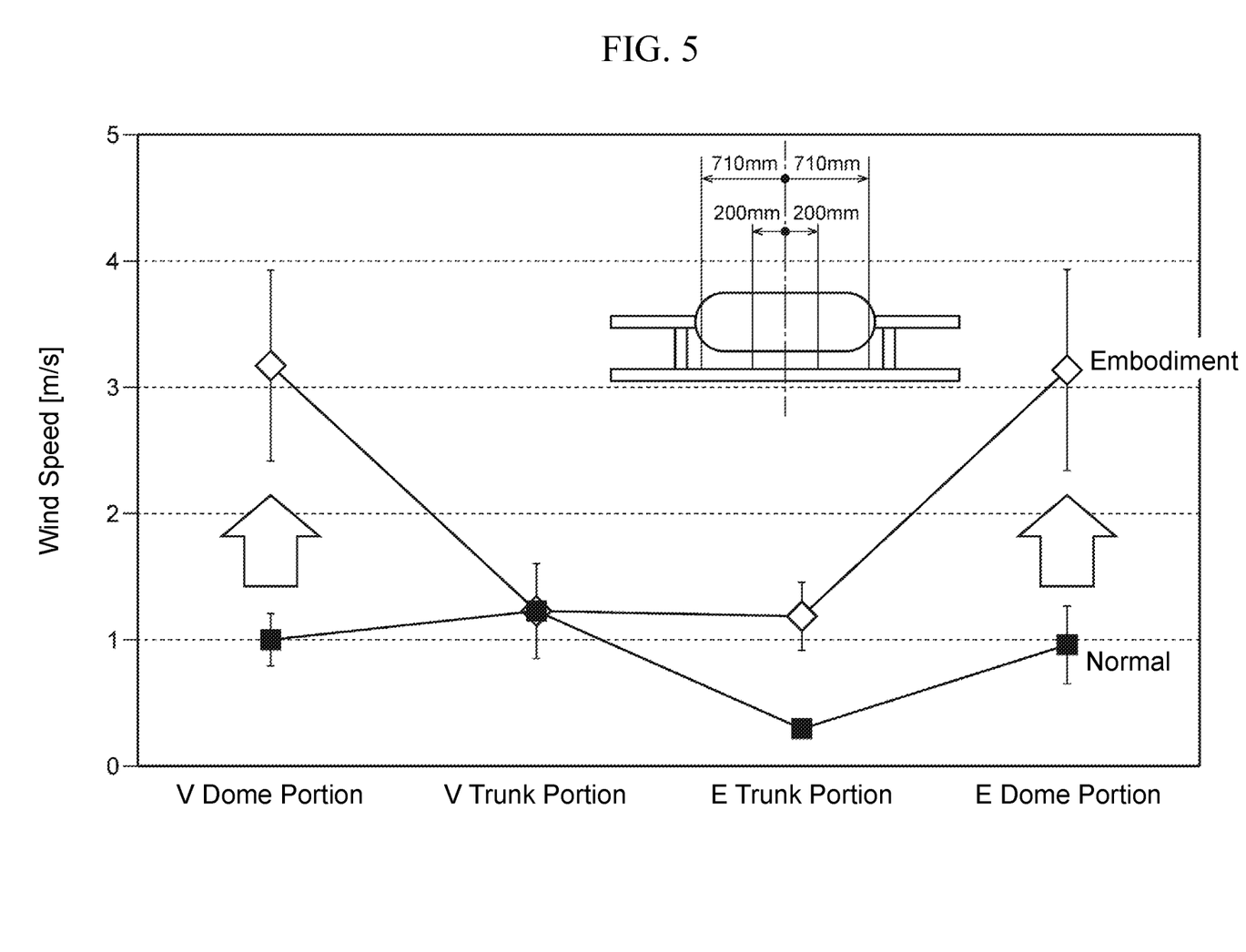
FIG. 5 is a diagram illustrating a relation between portions of a liner and a wind speed.

In addition, at this time, as illustrated in FIG. 5, the heating amount for heating the helical layer 22 covering the dome portions 12 is increased by increasing a wind speed blowing to the dome portions 12 compared with a wind speed blowing to the trunk portion 11. For comparison, FIG. 5 also illustrates a relation between the portions of the liner and the wind speed in a case of a normal thermal curing. It is seen from FIG. 5 that the wind speed blowing to the dome portions 12 is significantly increased in the embodiment compared with the case of the normal thermal curing.

The thermally curing step in the embodiment is, different from the thermal curing of the resin of the resin-impregnated fiber described in the first embodiment, the heating to change the physical property of the helical layer 22 for enhancing the interface strength on the helical layer 22 covering the dome portions 12.

To increase the heating amount for heating the helical layer 22 covering the dome portions 12 compared with the heating amount for heating the hoop layer 21 covering the trunk portion 11, instead of the above-described method of changing the wind speed and the air flow, it can be considered that a heating of the helical layer 22 from an inside of the dome portions 12 using a base heat transfer while performing the normal thermal curing.

Specifically, metal jigs are each connected to the valve-side base 13 and the end-side base 14 of the liner 10, and an IH heater or an IR heater is used to heat the jigs simultaneously with the normal thermal curing. Thus, the heat is transferred to the valve-side base 13 and the end-side base 14 via the jigs, and the helical layer 22 covering the dome portions 12 can be heated also from the inside of the dome portion 12.

Figure 6:
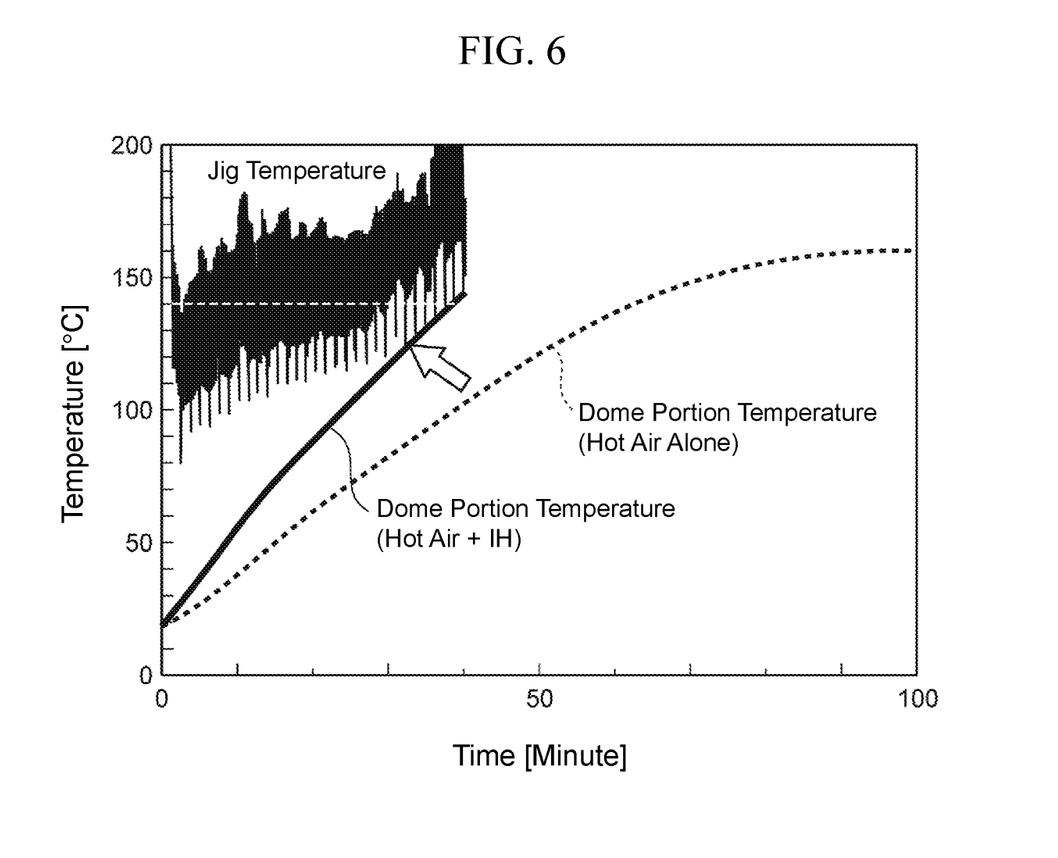
FIG. 6 is a diagram illustrating temperature changes of the dome portion in a case of a normal thermal curing and in a case of a combined use of the normal thermal curing and a base heat transfer by an IH heater.

FIG. 6 is a diagram illustrating temperature changes of the dome portion in the case of the normal thermal curing (hot air alone) and in a case of a combined use of the normal thermal curing and the base heat transfer by the IH heater (hot air+IH). As illustrated in FIG. 6, while the temperature of the dome portion is gradually raised by the heating in the case of the normal thermal curing, the temperature of the dome portion can be rapidly raised in the case of the combined use of the normal thermal curing and the base heat transfer by the IH heater.

Figure 7:
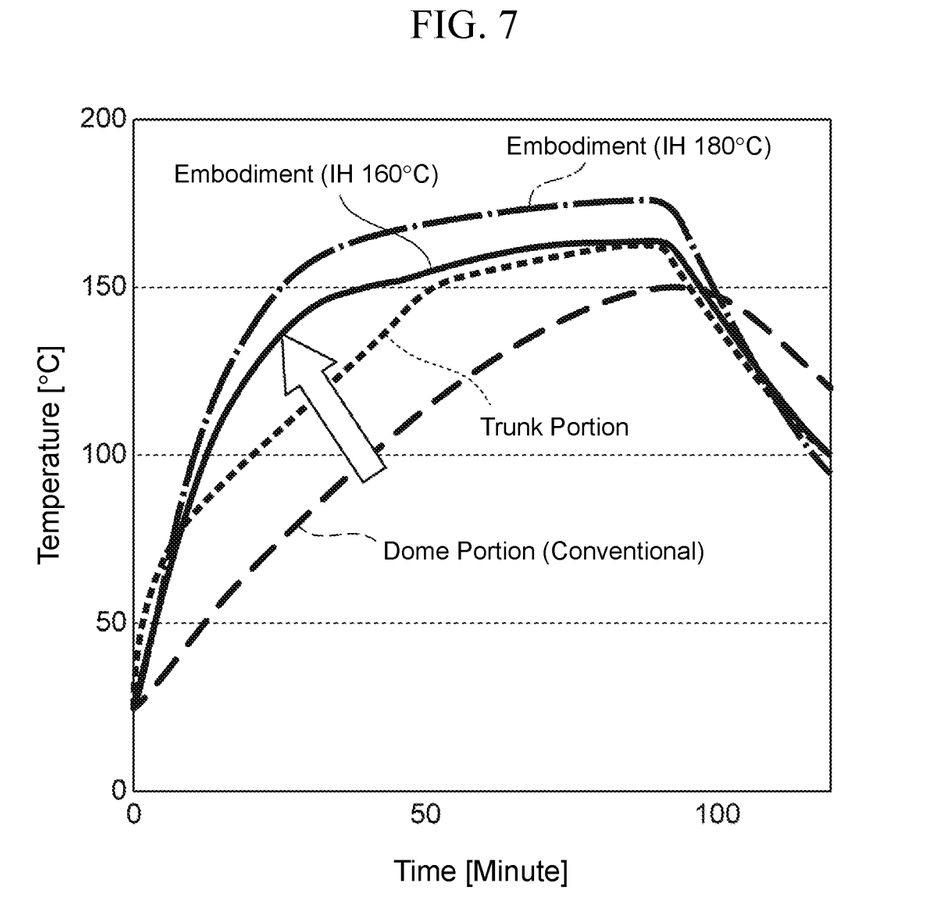
FIG. 7 is a diagram illustrating a temperature rise of the dome portion in a case of the base heat transfer.

FIG. 7 is a diagram illustrating the temperature rise of the dome portion in the case of the base heat transfer. As illustrated in FIG. 7, in the case of the conventional thermal curing, since the helical layer covering the dome portions is thick and the heat escapes also to the valve-side base and the end-side base, the temperature rise of the dome portion is slow compared with that of the trunk portion, and the temperature of the dome portion is lower than that of the trunk portion. However, employing the base heat transfer by the IH heater accelerates the temperature rise of the dome portion compared with that of the trunk portion, and thus, the temperature of the dome portion becomes higher than that of the trunk portion. It is seen that, in the case of the base heat transfer by the IH heater, the temperature rise increases as the heating temperature becomes high (160° C. to 180° C.).

The method for manufacturing the high pressure tank 1 according to the embodiment includes: a hoop layer lamination step of laminating the hoop layer 21 covering the trunk portion 11 so as to have the low fatigue strength and the high tensile strength compared with the helical layer 22 covering the dome portions 12 for the interface strength between the fiber and the resin; a helical layer lamination step of laminating the helical layer 22 covering the dome portions 12 so as to have the high fatigue strength and the low tensile strength compared with the hoop layer 21 covering the trunk portion 11 for the interface strength between the fiber and the resin; and a thermally curing step of thermally curing the laminated hoop layer 21 and the laminated helical layer 22. Accordingly, the dome portions 12 having a significant influence on the fatigue strength of the high pressure tank 1 can be reinforced with the helical layer 22 having the interface strength with the high fatigue strength while the trunk portion 11 having a significant influence on the tensile strength of the high pressure tank 1 is reinforced with the hoop layer 21 having the interface strength with the high tensile strength. Consequently, the tensile strength and the fatigue strength of the manufactured high pressure tank 1 can be provided at the same time.

In addition, in the thermally curing step, by increasing the heating amount for heating the helical layer 22 covering the dome portions 12 compared with the heating amount for heating the hoop layer 21 covering the trunk portion 11, the interface strength on the helical layer 22 covering the dome portions 12 can be enhanced. Accordingly, the tensile strength and the fatigue strength of the high pressure tank 1 can be easily provided at the same time.

While the following describes the present disclosure with Examples, the present disclosure is not limited to the scope of the Examples.

Example 1

In Example 1, a relation between an interfacial adhesive strength as the interface strength and the tensile strength was examined for a case where the sizing agent applied over the carbon fiber was changed (Method A), a case where the main agent of the resin impregnated in the fiber was changed from bisphenol F to bisphenol A (Method B1), a case where the curing agent of the resin impregnated in the fiber was changed from an aromatic amine to an acid anhydride (Method B2), and a case where the heating amount was changed (Method C). In Method A, only the sizing agent of the carbon fiber was different, O/C value was reduced by 75%, and the condition, such as the thermal curing condition was same.

Figure 8:
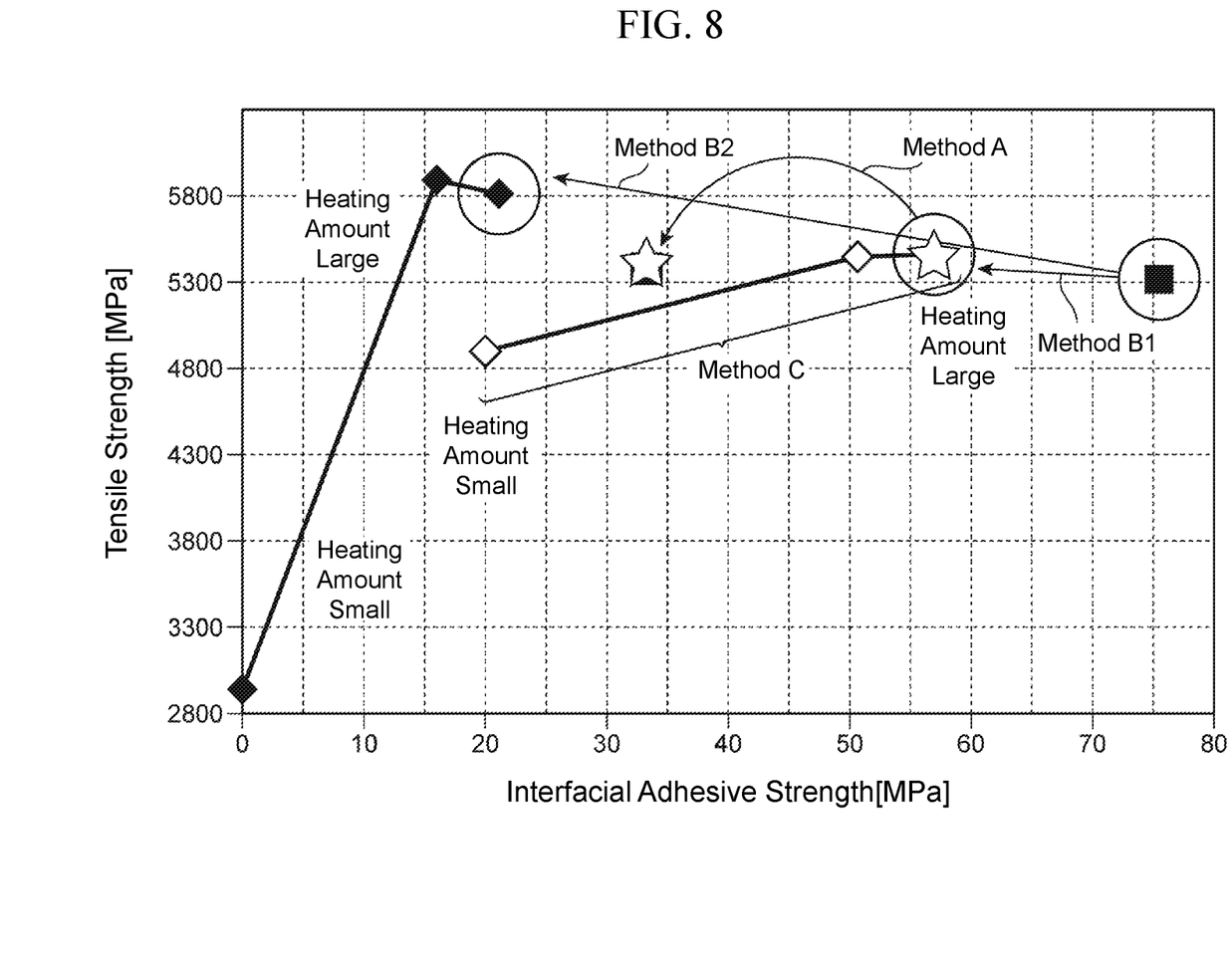
FIG. 8 is a diagram illustrating a result of an interfacial adhesive strength and the tensile strength according to Example 1.

FIG. 8 is a diagram illustrating the result of the interfacial adhesive strength and the tensile strength according to Example 1. As illustrated by stars in FIG. 8, it was seen that, in the case of Method A, the interfacial adhesive strength was decreased from 58 MPa to 34 MPa, an interlaminar shear strength effective for fatigue performance was decreased by 10% (not illustrated).

Meanwhile, in the case of Method B1, changing the main agent of the resin caused the interfacial adhesive strength to be decreased from about 75 MPa to about 58 MPa. In contrast, in the case of Method B2, changing the curing agent of the resin from the aromatic amine to the acid anhydride caused the interfacial adhesive strength to be significantly decreased from about 75 MPa to about 22 MPa.

Method C resulted in that the large heating amount increased the interfacial adhesive strength, in other words, the small heating amount decreased the interfacial adhesive strength.

Example 21

In Example 2, the high pressure tank was manufactured using the curing agent of the resin impregnated in the fiber differed between the hoop layer covering the trunk portion and the helical layer covering the dome portions as indicated in Table 1, and the tensile strength was examined and a fatigue test at normal temperature at 90 MPa was performed for the manufactured high pressure tank.

Comparative Example 1 and Comparative Example 2

For comparison, the high pressure tank was manufactured under the same condition as Example 2 with a prerequisite that the curing agent of the resin impregnated in the fiber was not changed, that is, the same curing agent was used for the hoop layer and the helical layer, and the tensile test and the fatigue test were performed similarly to those in Example 2 for the manufactured high pressure tank. The type of the curing agent or the resin was different between Comparative Example 1 and Comparative Example 2. Table 1 indicates the result.

TABLE 1

| | Curing Agent | | High Pressure Tank Strength | |
| --- | --- | --- | --- | --- |
| | Hoop Layer Covering Trunk Portion | Helical Layer Covering Dome Portions | Tensile Strength | Fatigue Test at Normal Temperature and 90 MPa |
| Example 2 | Acid Anhydride | Aromatic Amine | Excellent (200 MPa) | Excellent (100,000 Times or More) |
| Comparative Example 1 | Acid Anhydride | Acid Anhydride | Excellent (200 MPa) | Poor (22,000 Times) |

TABLE 1-continued

| | Curing Agent | | High Pressure Tank Strength | |
|---|---|---|---|---|
| | Hoop Layer Covering Trunk Portion | Helical Layer Covering Dome Portions | Tensile Strength | Fatigue Test at Normal Temperature and 90 MPa |
| Comparative Example 2 | Aromatic Amine | Aromatic Amine | Good (190 MPa) | Excellent (100,000 Times or More) |

It was seen from Table 1 that, in the case of Example 2, the tensile strength and the fatigue strength of the high pressure tank were able to be provided at the same time. Meanwhile, in both cases of Comparative Example 1 and Comparative Example 2, the tensile strength and the fatigue strength of the high pressure tank could not be provided at the same time.

Example 3

In Example 3, the high pressure tank was manufactured, as indicated in Table 2, by using the normal thermal curing and the base heat transfer by the IH heater in combination to heat the helical layer covering the dome portions, and the tensile strength was examined and the fatigue test at normal temperature at 90 MPa was performed for the manufactured high pressure tank.

Comparative Example 3 and Comparative Example 4

For comparison, the high pressure tank was manufactured by heating the helical layer covering the dome portions with the normal thermal curing alone, and the tensile strength was examined and the fatigue test was performed similarly to those in Example 3 for the manufactured high pressure tank. A furnace temperature of the thermal curing furnace was different between Comparative Example 3 and Comparative Example 4. Table 2 indicates the result.

TABLE 2

| | Heating Method | | High Pressure Tank Strength | |
|---|---|---|---|---|
| | Furnace Temperature | IH Heating P or N/P | Tensile Strength | Fatigue Test at Normal Temperature and 90 MPa |
| Example 3 | 140° C. | P | Excellent (200 MPa) | Excellent |
| Comparative Example 3 | 165° C. | N/P | Good (190 MPa) | Excellent |
| Comparative Example 4 | 140° C. | N/P | Excellent (200 MPa) | Poor |

P: IH Heating Performed
N/P: IH Heating Not Performed

It was seen from Table 2 that, in the case of Example 3, the tensile strength and the fatigue strength of the high pressure tank were able to be provided at the same time. Meanwhile, in both cases of Comparative Example 3 and Comparative Example 4, the tensile strength and the fatigue strength of the high pressure tank could not be provided at the same time.

While the embodiments of the present disclosure have been described in detail above, the present disclosure is not limited thereto, and can be subjected to various kinds of changes in design without departing from the spirit and scope of the present disclosure described in the claims.

DESCRIPTION OF SYMBOLS

1 High pressure tank
10 Liner
11 Trunk portion
12 Dome portion
13 Valve-side base
14 End-side base
15 Hoop winding resin-impregnated fiber
16 Helical winding resin-impregnated fiber
20 Reinforcing layer
21 Hoop layer
22 Helical layer

What is claimed is:

1. A high pressure tank comprising:
   a liner that includes a cylindrically-shaped trunk portion and dome portions disposed on both ends in an axial direction of the trunk portion;
   a hoop layer in which a fiber impregnated with a resin is wound in hoop winding and laminated to cover the trunk portion; and
   a helical layer in which a fiber impregnated with a resin is wound in helical winding and laminated to cover at least the dome portions,
   wherein an interface strength between the fiber and the resin on the hoop layer covering the trunk portion has a low fatigue strength and a high tensile strength compared with an interface strength between the fiber and the resin on the helical layer covering the dome portions.

2. The high pressure tank according to claim 1,
   wherein the fiber and/or the resin used for the hoop layer covering the trunk portion and the helical layer covering the dome portions are different.

3. The high pressure tank according to claim 1,
   wherein heating amounts for heating the resins of the hoop layer covering the trunk portion and the helical layer covering the dome portions are different.

4. A method for manufacturing a high pressure tank, wherein
   the high pressure tank includes a liner that includes a cylindrically-shaped trunk portion and dome portions disposed on both ends in an axial direction of the trunk portion, a hoop layer in which a fiber impregnated with a resin is wound in hoop winding and laminated to cover the trunk portion, and a helical layer in which a fiber impregnated with a resin is wound in helical winding and laminated to cover at least the dome portions, the method comprising:
   laminating the hoop layer covering the trunk portion so as to have a low fatigue strength and a high tensile strength compared with the helical layer covering the dome portions for an interface strength between the fiber and the resin; and
   laminating the helical layer covering the dome portions so as to have a high fatigue strength and a low tensile strength compared with the hoop layer covering the trunk portion for an interface strength between the fiber and the resin.

5. The method for manufacturing a high pressure tank according to claim 4, wherein the fiber and/or the resin used in the laminating of the hoop layer and the laminating of the helical layer are different.

6. The method for manufacturing a high pressure tank according to claim 4, further comprising thermally curing the laminated hoop layer and the laminated helical layer, wherein in the thermally curing, a heating amount for heating the hoop layer covering the trunk portion is different from a heating amount for heating the helical layer covering the dome portions.

* * * * *